United States Patent [19]

Nakamura

[11] 4,279,154
[45] Jul. 21, 1981

[54] SURFACE TEMPERATURE MEASURING DEVICE

[75] Inventor: Tsuneo Nakamura, Tokyo, Japan

[73] Assignee: Anritsu Keiki Kabushiki Kaisha, Tokyo, Japan

[21] Appl. No.: 80,170

[22] Filed: Sep. 28, 1979

[30] Foreign Application Priority Data

Sep. 30, 1978 [JP] Japan .................... 53-133553[U]

[51] Int. Cl.³ .................... G01K 1/16; G01K 7/02
[52] U.S. Cl. .................... 73/359 R; 136/221; 136/233
[58] Field of Search .................... 73/359 R, 344, 342; 174/110 FC, 110 N; 136/225, 221, 230, 233

[56] References Cited

U.S. PATENT DOCUMENTS

| | | | |
|---|---|---|---|
| 2,022,515 | 11/1935 | Orchard | 73/359 R |
| 2,996,696 | 8/1961 | Harman | 73/342 X |
| 3,054,397 | 9/1962 | Benzinger | 73/359 |
| 3,095,709 | 7/1963 | Demand | 136/221 X |
| 3,151,484 | 10/1964 | Feehan | 73/359 R |
| 3,165,426 | 1/1965 | Beckman | 73/359 R |
| 3,321,974 | 5/1967 | Sterbutzel | 136/221 X |
| 3,347,099 | 10/1967 | Schraeder | 73/359 R |
| 3,395,050 | 7/1968 | Senbokuya | 136/221 |
| 3,407,097 | 10/1968 | Engelhard | 73/359 R X |
| 3,408,453 | 10/1968 | Shelton, Jr. | 174/110 FC |
| 3,573,995 | 4/1971 | Senbokuya | 136/223 |
| 3,961,689 | 6/1976 | Leskovec | 308/3 C X |
| 3,984,152 | 10/1976 | Haines | 308/241 X |
| 4,046,009 | 9/1977 | Saur | 73/359 R |

*Primary Examiner*—Daniel M. Yasich

[57] ABSTRACT

A thermocouple member having a surface portion adapted for heat contact with the surface of the body to measure the temperature thereof is provided with a low friction, electrically insulated layer such as of a fluorocarbon resin over the surface portion. The thermocouple member is thereby prevented from being brought into direct contact with the surface of the body. A heat sensing section having such a coated thermocouple member is useful for measuring the temperature of a body moving either linearly or angularly as well as an electrically driven body.

9 Claims, 8 Drawing Figures

SURFACE TEMPERATURE MEASURING DEVICE

BACKGROUND OF THE INVENTION

This invention relates generally to temperature measuring devices and more particularly to an improvement in a thermocouple-type heat sensing section of a device for measuring the temperature of the surface of a body.

With conventional thermometers using a thermocouple member, the measurement of the temperature of the surface of a body is conducted by bringing a part of the surface of the thermocouple member into direct contact with the surface of the body. In this case, when the body to be measured is a rotating member such as a fuser roll of an electrophotographic copying machine, the surface of the roll is liable to be injured due to the physical contact between the roll surface and the thermocouple metal surface. Additionally, the sliding contact therebetween produces heat as a result of friction thereby inhibiting precise measurement of the true temperature of the surface of the body. Furthermore, such a conventional thermometer is not applicable to the temperature measurement of electrical parts or metals through which an electrical current is caused to flow, due to the possible creation of a short-circuit which could occur because the thermocouple member is an electrically good conductor.

SUMMARY OF THE INVENTION

It is, therefore, an object of the present invention to provide an improved heat sensing section for thermoelectric thermometers having a thermocouple member, which allows the measurement of the surface temperature of a body moving either linearly or angularly without injuring the surface of the body and with minimized heat generation by friction.

Another object of the present invention is to provide a heat sensing section of such thermometers, which can be adapted to the temperature measurement of electrically powered parts.

In accomplishing the foregoing objects, there has been provided in accordance with the present invention an improved heat sensing section of a device for measuring the temperature of the surface of a body. The heat sensing section includes a thermocouple member having an outer surface portion adapted for heat and pressure contact with the surface of the body. The improvement involves: a slippery, electrically insulated layer integrally provided over at least the outer surface portion of the surface of the thermocouple member. As a consequence, the thermocouple member is prevented from directly contacting the surface of the body.

The slippery layer, preferably, is formed of fluorocarbon resins, polyamide resins, polyimide resins or molybdenum disulfide and has a thickness of between 5 and 100μ.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS

Figure 1:
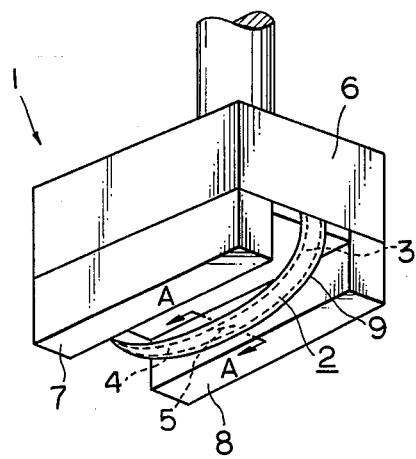
FIG. 1 is a perspective view schematically showing an embodiment of the heat sensing section of a thermoelectric thermometer according to the present invention.

FIG. 1 depicts the heat sensing section of a thermoelectric thermometer comprising the present invention. Designated generally by the reference character 1 is the heat sensing section which includes a thermocouple member 2. The thermocouple member 2 is formed from two foil strips or tapes of thermocouple elements 3 and 4 which are butted or partly overlapped with each other at their one ends to form a thermoelectric junction 5.

The thermocouple member 2 is secured to opposite ends of a supporting member 6 of the sensing section 1 such that an arcuate or at least partially circular portion is formed therebetween. On measurement, a part of the arcuate portion including the thermoelectric junction 5 is brought into heat and pressure contact with the surface of a body to be measured (not shown). To ensure sufficient contact area and pressure therebetween, it is preferred that the thermocouple member 2 have resiliency. Even if the thermocouple member 2 is poor in resilience, however, the desired contact may be obtained by providing an auxiliary, resilient member adjacent the thermocouple member 2, as described hereinafter.

A pair of laterally spaced apart legs 7 and 8 are mounted on the supporting member 6, between which the arcuate portion of the thermocouple member 2 is arranged. Each of the legs 7 and 8 has a height less than the highest part of the arcuate portion of the thermocouple member 2 so that when the top surfaces of the legs 7 and 8 are pressed against the body whose surface temperature is to be measured, deformation of the arc of the thermocouple member 2 may be limited, ensuring a desirable contact between the thermocouple member 2 and the body whose surface temperature is to be measured. It is preferred that the length of the legs 7 and 8 be great enough in the longitudinal direction of the thermocouple member 2 so as to protect the contact portion between the thermocouple member 2 and the body whose surface temperature is to be measured from the influence of the environmental air. Preferably, the top surface of each leg 7 and 8 is formed of a slippery, low-friction, electrically insulated material such as a polytetrafluoroethylene resin.

Figure 2:
FIG. 2 is an enlarged cross-sectional view taken on line A—A of FIG. 1.

A low friction, electrically insulating layer 9 is provided over at least the outer surface portion of the surface of the thermocouple member 2, at which portion the thermocouple member 2 thermally contacts the body whose surface temperature is to be measured. In the particular case illustrated in FIGS. 1 and 2, the insulating layer 9 is formed by bonding two sheets of electrically insulating, adhesive tape to both sides of the thermocouple member 2. The layer 9 may also be formed by applying a coating composition onto the surface of the thermocouple member 2.

The coating composition useful for forming the layer 9 includes an electrically insulating paint capable of forming a coating having a slippery surface. Illustrative of such coating compositions are those which contain, as their main component, a resin selected from fluorocarbon resins such as polytetrafluoroethylene, polychlorotrifluoroethylene and polyvinyl fluoride; polyimide resins; and polyamide resins. A molybdenum disulfide-base paint or ceramic coating material may also be used in order to achieve the purposes of the present invention. These coating compositions may be applied onto the surface of the thermocouple member in any suitable manner such as brush coating, dip coating, spray coating, roll coating, bake coating and electrostatic coating.

The formation of the insulating layer 9 on the thermocouple member 2 may also be effected with the use of an electrically insulating film or tape made of the abovementioned resins. The tape or sheet may be bonded to the thermocouple member 2 by means of an adhesive layer such as of a silicone-type adhesive.

The thickness of the layer 9 should be as thin as possible and is generally between 5 and 100μ, and preferably is between 10 and 30μ.

It is preferred that the material of the insulating layer 9 be selected according to a range of temperature to be measured. For example, in the case of measurement of a temperature in the range of up to 200° C., polytetrafluoroethylene is most suitably employed. In the case of a temperature in the range of up to 400° C., molybdenum disulfide is suited. For the measurement of higher temperatures, a ceramic coating may be used.

As described previously, the insulating layer 9 is provided over at least the outer surface portion of the thermocouple member 2 with which the surface of the body to be measured is thermally contacted. That is, the thermocouple member 2 may be covered with the insulating layer 9 over that portion alone, the entire surface of the side including that portion, the opposite side of that portion as well as that portion, or the entire surface of both sides of the thermocouple member 2.

Another embodiment of the heat sensing section of this invention is shown in FIGS. 3 through 7, in which the components indicated as having reference characters 101 through 109 correspond to and are the same as the components having reference characters 1 through 9, respectively, in both feature and function except that the top faces of legs 107 and 108 are each curved consistently with the curved surface of the body the temperature of which is to be measured. In this embodiment, two substantially parallel and laterally spaced strips 110 and 111 of a resilient member, preferably a metal member such as steel and stainless steel, are provided at both sides of the thermocouple member 102. The two resilient strips 110 and 111 and the thermocouple member 102 are mechanically connected to each other by means of a center holder 112 located at or near a thermoelectric junction 105 and/or one or more side holders 113 located away from the thermoelectric junction 105 so that the thermocouple member 102 may be deformed in association with the strips 110 and 111. As a result, even if the thermocouple member 102 is low in resiliency, it may still contact with the surface of the body to be measured with desired contact area and pressure. While the center holder 112 can be formed of a thermally conductive material such as stainless steel, the side holder 113 should be made of an electrical insulator such as a ceramic. The details of the resilient strips 110 and 111 and the holding mechanism therefor to the thermocouple member 102 are fully described in U.S. Pat. Nos. 3,573,995 and 3,395,050, the disclosures of which are incorporated herein by reference.

Figure 3:
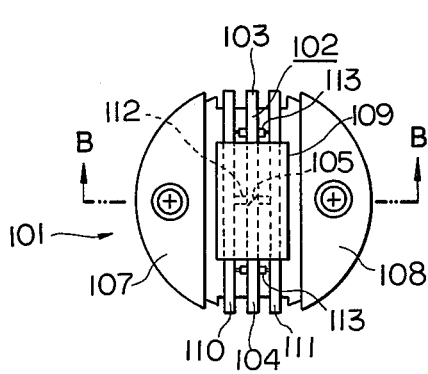
FIG. 3 is a plan view schematically showing another embodiment of the heat sensing section of this invention.
Figure 4:
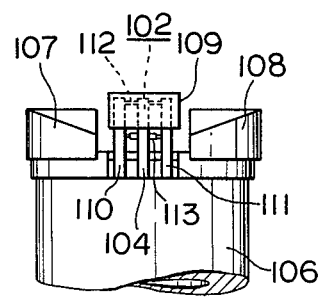
FIG. 4 is a side elevational view of the heat sensing section of FIG. 3.
Figure 5:
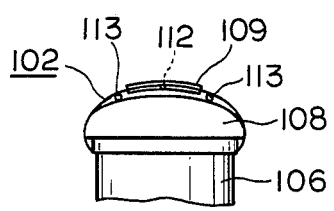
FIG. 5 is a side elevational view of FIG. 4.
Figure 6:
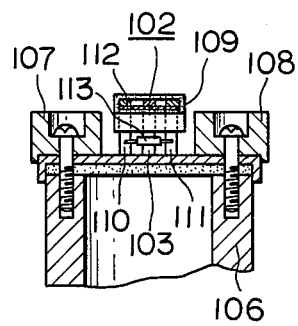
FIG. 6 is a cross-sectional elevational view taken on line B—B of FIG. 3.
Figure 7:
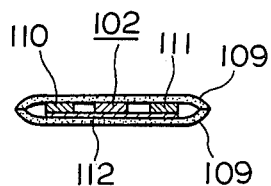
FIG. 7 is an enlarged, cross-sectional view schematically showing the thermocouple member of the heat sensing section of FIG. 3.

As best seen in FIGS. 3 and 7, a common, low friction, electrically insulated layer 109 is provided, generally symmetrically with respect to the thermoelectric junction 105 of the thermocouple member 102, over both side surfaces of the thermocouple member 102 and the resilient strips 110 and 111 in a length sufficient to prevent them from directly contacting the surface of the body whose surface temperature is to be measured. Thus, when the heat sensing section 101 is placed on the body such that the legs 107 and 108 contact with the curved surface of the body whose surface temperature is to be measured, the thermocouple member 102 may be brought into pressure contact, together with the metal strips 110 and 111, with the body whose surface temperature is to be measured through the insulating layer 109. As described hereinabove with reference to FIG. 1, the insulating layer 109 may be provided over only the outer surfaces of the thermocouple member 102 and the resilient strips 110 and 111. The insulating layer 109 may be separately provided over each of the thermocouple member 102 and the resilient strips 110 and 111.

Figure 8:
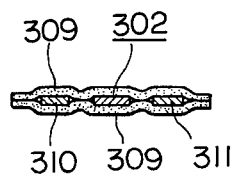
FIG. 8 is an enlarged, cross-sectional view, similar to FIG. 7, schematically showing a further embodiment of the heat sensing section of this invention.

FIG. 8 illustrates a further embodiment of this invention in which the center holder 112 of FIGS. 3 through 7 is omitted. In this case two patches of a slippery, electrically insulating sheet are bonded to both sides of a thermocouple member 302 and resilient strips 310 and 311 to form a common insulating surface 309. Thus, the insulating surface layer 309 surrounding the thermocouple member 302 and the resilient strips 310 and 311 functions both as holding means therefor and as a slippery, electrically insulating means.

In the foregoing embodiments, the thermocouple member is shaped into an arc in order to impart resiliency thereto. In an alternative construction, a resilient material such as a sponge may be interposed between the thermocouple member and the supporting member. In this manner the thermocouple member covered with the slippery, electrically insulated surface layer may be adapted for pressure contact with the body whose surface temperature is to be measured.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a surface temperature measuring device for measuring the temperature of the surface of a body wherein the temperature sensing section includes a thermocouple member having an outer surface portion adapted for heat and pressure contact with the surface of the body to measure the temperature thereof, the improvement which comprises a slippery, electrically insulted layer of film integrally bonded to at least said outer surface portion of said thermocouple member, said layer of film being between 5 and 100μ thick and formed of a resin selected from the group consisting of fluorocarbon resin, polyamide resins and polyimide resins, there being further included a pair of laterally spaced apart, resilient metal strips extending in parallel with and along both sides of the thermocouple member, each said strip having an outer surface part adapted to pressure contact the surface of the body whose temperature is to be measured, said outer surface portion of said thermocouple member cooperating with said outer surface parts of said strips, whereby said thermocouple member including said film layer is deformable in association with said strips and may be brought into pressure contact with the surface of the body, said layer being provided over at least said outer surface portion of said thermocouple member and at least said outer surface part of each of said strips.

2. The temperature sensing section as set forth in claim 1, further comprising a pair of laterally spaced apart, resilient metal strips extending in parallel with and along both sides of the thermocouple member, each said strip having an outer surface part adapted to pressure contact with the surface whose temperature is to be measured, said outer surface portion of said thermocouple member cooperating with said outer surface parts of said strips whereby said thermocouple member may be brought into pressure contact with the surface of the body, said layer being provided over at least said outer surface portion of said thermocouple member and at least said outer surface part of each of said strips.

3. The device as set forth in claim 1, wherein said layer is formed of a member selected from the group consisting of fluorocarbon resins, polyamide resins, polyimide resins and molybdenum disulfide.

4. The device as set forth in claim 3, wherein said layer has a thickness of between 5 and 100μ.

5. The device as set forth in claim 3, wherein said layer is a coating of a composition containing said member.

6. The device as set forth in claim 5, wherein said layer has a thickness of between 5 and 100μ.

7. The device as set forth in claim 1, further comprising a supporting member on which said thermocouple member is secured and a pair of laterally spaced apart legs mounted on said supporting member, said thermocouple member being disposed between said pair of legs, each said leg having a height such that said outer surface portion of said thermocouple member can be brought into pressure contact with the surface whose temperature is to be measured when said legs are pressed against the surface whose temperature is to be measured.

8. The device as set forth in claim 1 wherein the outer portion of said thermocouple member is arcuate.

9. The device as set forth in claim 1 wherein said thermocouple member is at least partly circular.

* * * * *